United States Patent [19]

Gianneli

[11] 4,293,414
[45] Oct. 6, 1981

[54] SLOTTED SHEET FILTER ELEMENT

[75] Inventor: Joseph F. Gianneli, Paterson, N.J.

[73] Assignee: Ecodyne Corporation, Lincolnshire, Ill.

[21] Appl. No.: 92,047

[22] Filed: Nov. 7, 1979

Related U.S. Application Data

[63] Continuation of Ser. No. 902,988, May 4, 1978, abandoned.

[51] Int. Cl.³ .............................................. B01D 37/02
[52] U.S. Cl. ................................. 210/193; 210/323.2; 210/436; 210/437; 210/497.01
[58] Field of Search ..................... 210/75, 193, 323 T, 210/338, 436, 489, 497 R, 498, 499, 777, 778, 437

[56] References Cited

U.S. PATENT DOCUMENTS

| | | | |
|---|---|---|---|
| 1,916,393 | 7/1933 | Smith | 210/498 |
| 2,267,752 | 12/1941 | Ruska et al. | 210/498 |
| 2,382,400 | 8/1945 | Decker et al. | 210/484 |
| 3,177,945 | 4/1965 | Fether | 166/227 |
| 3,250,703 | 5/1966 | Levendusky | 210/24 |
| 3,277,814 | 10/1966 | Malm et al. | 100/295 |
| 3,279,608 | 10/1966 | Soriente et al. | 210/232 |
| 3,359,192 | 12/1967 | Heinrich et al. | 204/143 |
| 3,520,418 | 7/1970 | Guinard | 210/498 |
| 3,680,700 | 8/1972 | Ryan | 210/75 |
| 3,708,848 | 1/1973 | Guinard | 210/498 |
| 3,715,033 | 2/1973 | Soriente | 210/193 |
| 3,779,386 | 12/1973 | Ryan | 210/193 |

FOREIGN PATENT DOCUMENTS 1069766 7/1954 France ................................ 210/498

OTHER PUBLICATIONS

Aerospace Recommended Practice, ARP901, Society of Automotive Engineers, Inc. technical bulletin, Mar. 1968, pp. 1-12.

*Primary Examiner*—Ivars C. Cintins
*Attorney, Agent, or Firm*—Hume, Clement, Brinks, Willian & Olds, Ltd.

[57] ABSTRACT

A filter element adapted to be precoated with a filter medium, having a porous tubular core, and a means supporting the filter medium precoat including a discontinuously slotted sheet arranged concentrically about the tubular core. Each of the slots has an elongated configuration, and provides an absolute particle retention ability of less than 50 microns while reducing gas entrapment in the filter element.

According to an additional embodiment of the invention, the filter element includes a porous tubular core, a means for supporting the filter medium precoat terminating a distance from an end of the tubular core so that a relatively low bubble pressure element section is defined, and a discontinuously slotted sheet means positioned over the relatively low bubble point pressure element section and sealed to the precoat support means. Additional embodiments include a vent sleeve having an aperture positioned over the discontinuously slotted sheet means, wherein the slotted sheet means is a band or disc of slotted sheet material.

15 Claims, 4 Drawing Figures

SLOTTED SHEET FILTER ELEMENT

This is a continuation of application Ser. No. 902,988, filed May 4, 1978, now abandoned.

BACKGROUND OF THE INVENTION

The invention relates to a filter element for use in a unit to filter or purify liquid. In particular, the invention is directed to a filter element having a means for reducing gas entrapment in the filter element during precoating and filtration.

Methods are known in the art for purifying liquids by passing them through a filter element which has been precoated with a layer of ion exchange resin particles, such as a precoat medium in the size range of 60 to 400 mesh, as disclosed in U.S. Pat. No. 3,250,703, issued May 10, 1966, and assigned to the assignee of this invention.

In a typical system of this type a plurality of filter elements are mounted within a filter tank. These filter elements of the prior art generally include a stainless steel core having perforations or openings therein, a layer of coarse wire screen positioned about the core, and a layer of fine mesh wire screen surrounding the coarse screen for supporting the precoat filter medium. A precoat layer of filter medium is deposited on the upstream sides of filter elements by passing a water slurry of filter particles through the filter tank. The length of these filter elements is limited by the expense of stainless elements and the size of the tanks that can be effectively used for such filtration. Because of this size limitation, it is desirable to precoat the entire filter element with a filter medium.

However, during filling of the filter tank with liquid in order to deposit a slurry of precoat particles or to commence purification of liquid through the filter elements, a certain amount of air or other gases typically accumulates in the upper portion of each filter and is trapped because of capillarity. As the pores of the filter element are wetted by the liquid in the tank, an interface is defined between the liquid, air or other gases in the filter tank, and the walls of each pore in the wire screen supporting the filter medium. The surface tension of the liquid across the pore creates a force that must be overcome for gas to pass through the pore. The net gas pressure in the pore which is in equilibrium with the surface tension force caused by capillarity at the largest pore in a filter element is defined as the bubble point pressure, according to Aerospace Recommended Practice (ARP) 901 of the Society of Automotive Engineers, Inc. The lower the bubble point pressure for a given filter element, the lower the probability that gas will be trapped in a filter element during precoating or filtration.

It is known in the art that this entrapped gas has at least two deleterious effects on the filtration system. First, the entrapped gas prevents the flow of slurry through and precoating of those areas of the filter elements in which the gas is present, thereby creating unprecoated areas in which liquid with impurities can pass through the filter element. Second, the presence of entrapped gas during the filtering cycle of the system allows the gas to be periodically released outwardly through the filter elements, which may disrupt or even remove portions of the precoated filter material.

The problem of entrapped gas within filter elements is especially serious in filter elements with absolute particle retention abilities less than 50 microns and with precoat filter media having low pressure drop characteristics, such as powdered ion exchange resins in the size range of 60 to 400 mesh, or smaller. The absolute particle retention ability is typically defined by the minimum dimension of the largest pore in the element. Several attempts to overcome the problem of accumulated gas have been disclosed and known in the prior art, such as described in U.S. Pat. No. 3,680,700, issued Aug. 1, 1972 and U.S. Pat. No. 3,779,386, issued Dec. 19, 1973, both of which are assigned to the assignee of this invention.

With the elements of the prior art a significant volume of entrapped gas accumulates at the top of each element. If the elements are mounted in a filter tank having a bottom tube sheet or plate between an upper influent compartment and a lower filtrate compartment, the gas is trapped within the element core. If the filter tank has a top tube sheet, the gas is trapped outside each filter element. The outside surface area of each element adjacent the entrapped gas volume is not precoated. When the pressure in the filter tank increases above the pressure during precoating causing the entrapped gas volume to be compressed or the force of capillarity to be exceeded or both, unpurified liquid flows through the exposed unprecoated portion of the filter element. The filter tank pressure increases typically in three instances: first, when service flow commences; second, if a flow surge occurs during service flow; and third, when undissolved impurities build up significantly on the filter element. The flow of unpurified liquid through the exposed portion of the element can result in plugging of the element by particulates in the water or premature termination of a filtering cycle by the presence of impurities in the effluent from the filter system.

As disclosed in the above-mentioned patent references, attempts have been made in the prior art to overcome the problem of entrapped gas. For instance, U.S. Pat. Nos. 3,680,700 and 3,779,386 disclose a precoat filter element having a dome-shaped cover or vent sleeve around the upper portion of the element. The cover includes a vent hole communicating with the internal portion of the filter elements. While this method is practical with filter elements for general use with filter media in a size range of 60 to 400 mesh, it cannot be effectively used with a filter element having a low absolute particle retention ability without substantial modification of the apparatus. When an absolute particle retention ability of 50 microns or less is required and a wire mesh cloth is used to achieve this rating, such a filter element has been uneconomical because of the expense of material involved in providing the necessary vent sleeve and the diminution in effective filtering area of the filter element because of the length of the vent sleeve. This diminution is illustrated by the critical length for sizing a vent sleeve, defined by the height of the volume of entrapped gas which will be present after the liquid fill step used in conjunction with the filter tank if no vent sleeve were provided. This height of the volume of entrapped gas is measured as the vertical distance from gas-liquid interface to the highest exposed portion of the filter medium support layer at the top of the filter element, and this height is proportional to the bubble point pressure of the layer of the element having the highest bubble point pressure, typically the outermost layer which supports the filter medium.

Other attempts to overcome the problem of entrapped gas in the prior art include addition of a surface-active agent to reduce the surface tension of the liquid, and a complete drying of the filter element before filling with liquid, to eliminate the liquid providing the surface tension force across an element pore. Addition of a surface-active agent is not an acceptable solution to the problem because the surfactant promotes an unacceptable degree of foaming and the addition of such chemicals as surfactants to the liquid to be purified is often undesirable. Complete drying of the filter element before liquid filling does eliminate entrapped gas, but utilizes a significant amount of time, thereby lengthening the down time of a filter tank system and reducing the amount of time during which the system can be used for filtration.

SUMMARY OF THE INVENTION

According to a preferred embodiment of the present invention there is provided a filter element adapted to be precoated with a filter medium including a porous tubular core and a means for supporting the filter medium precoat including a discontinuously slotted sheet arranged concentrically about the tubular core. The bubble point pressure of the filter element is generally decreased below that which would be expected from a filter element of the prior art having a similar absolute particle retention ability, thereby reducing gas entrapment.

Whereas typical prior art element layers for supporting filter media have consisted of a fine screen or mesh which is concentrically located over a coarse drain screen in turn positioned around a central tubular core, the apparatus of the present invention replaces the fine mesh screen with a discontinuously slotted sheet. Each of the slots of the present invention has an elongated configuration with a width chosen to provide a desired absolute particle retention ability, preferably less than 50 microns. The length of the slot is chosen so that the bubble point pressure is reduced significantly over a comparable fine mesh having an absolute particle retention ability of less than 50 microns thereby diminishing the amount of entrapped gas within the filter element.

According to another preferred embodiment of the present invention, there is provided a filter element adapted to be precoated with a filter medium, including a porous tubular core and a means for supporting the filter medium precoat, positioned about the tubular core and terminating a distance from an end of the tubular core, so that a relatively low bubble point pressure element section is defined. The filter element also includes a discontinuously slotted sheet means extending around the circumference of the tubular core at the relatively low bubble point pressure element section and sealed to the precoat support means.

A further preferred embodiment includes a vent sleeve positioned over and attached to the slotted sheet means and having an aperture covered by the slotted sheet means. Alternatively, the slotted sheet means is positioned beneath the vent sleeve aperture, but does not extend around the circumference of the tubular core, and the vent sleeve is sealed to the precoat support means. These embodiments achieve the advantages of reduction of gas entrapment in the filter element by providing a low bubble point pressure means at a section of the element having an area for gas release through a discontinuously slotted sheet. This section is positioned in the filter tank so that the maximum driving force of gas for expulsion acts on this section.

In the preferred embodiments, the slotted sheet means is preferably diffusion bonded to an adjacent member of the filter element, typically a coarse wire mesh layer. Particularly for an embodiment having the slotted sheet means as an outer layer extending the full length of the filter element, this diffusion bonding has several advantages. Points of bonding contact between the slotted sheet means and the coarse wire mesh are numerous, thereby reducing the possibility of folding or crimping of the slotted sheet means during increase and reversals in the liquid flow and force, and resultant stress and tearing of the slotted sheet means. Also, diffusion bonding at numerous points of contact provides substantial support for the slotted sheet material, and reduces the possibility of widening of the slots from physical mishandling when compared with fine wire mesh screen of similar absolute particle retention ability.

According to some of the preferred embodiments the apparatus of the present invention having an outer slotted sheet precoat support means along the entire length of the filter element overcomes the disadvantages of the prior art by significantly reducing the bubble point pressure of the filter element, and in particular the outer layer of the element, which generally has the greatest bubble point pressure in the filter element and is therefore the determinative layer in setting the bubble point pressure. With the discontinuously slotted outer sheet layer of the filter element of the present invention, particle retention of a size smaller than 50 microns can be obtained, while simultaneously providing a filter element that has a low resistance to the passage of gas even when wetted. A filter element is thereby provided with a particle retention equal to that of an element using fine woven wire cloth as a covering, but with a superior ability to release gas as compared to those filter elements using the size and mesh of woven wire cloth required for the same absolute particle retention ability.

Furthermore, the apparatus of the present invention including the discontinuously slotted outer layer is less prone to irreversible plugging than filter elements using woven wire cloth with similar absolute particle retention ratings.

The result of these advantages is that the preferred embodiments of the present invention provide apparatus which reduce the cost of a filter system having a given effective filtering area by permitting more of the filter element area to be effectively precoated by a filter medium and utilized during a filtration process.

Other advantages, objects, and features of the present invention will become apparent upon reading the following detailed description of the preferred embodiment in conjunction with the accompanying drawings.

DESCRIPTION OF THE PREFERRED EMBODIMENTS

Figures 1, 2:
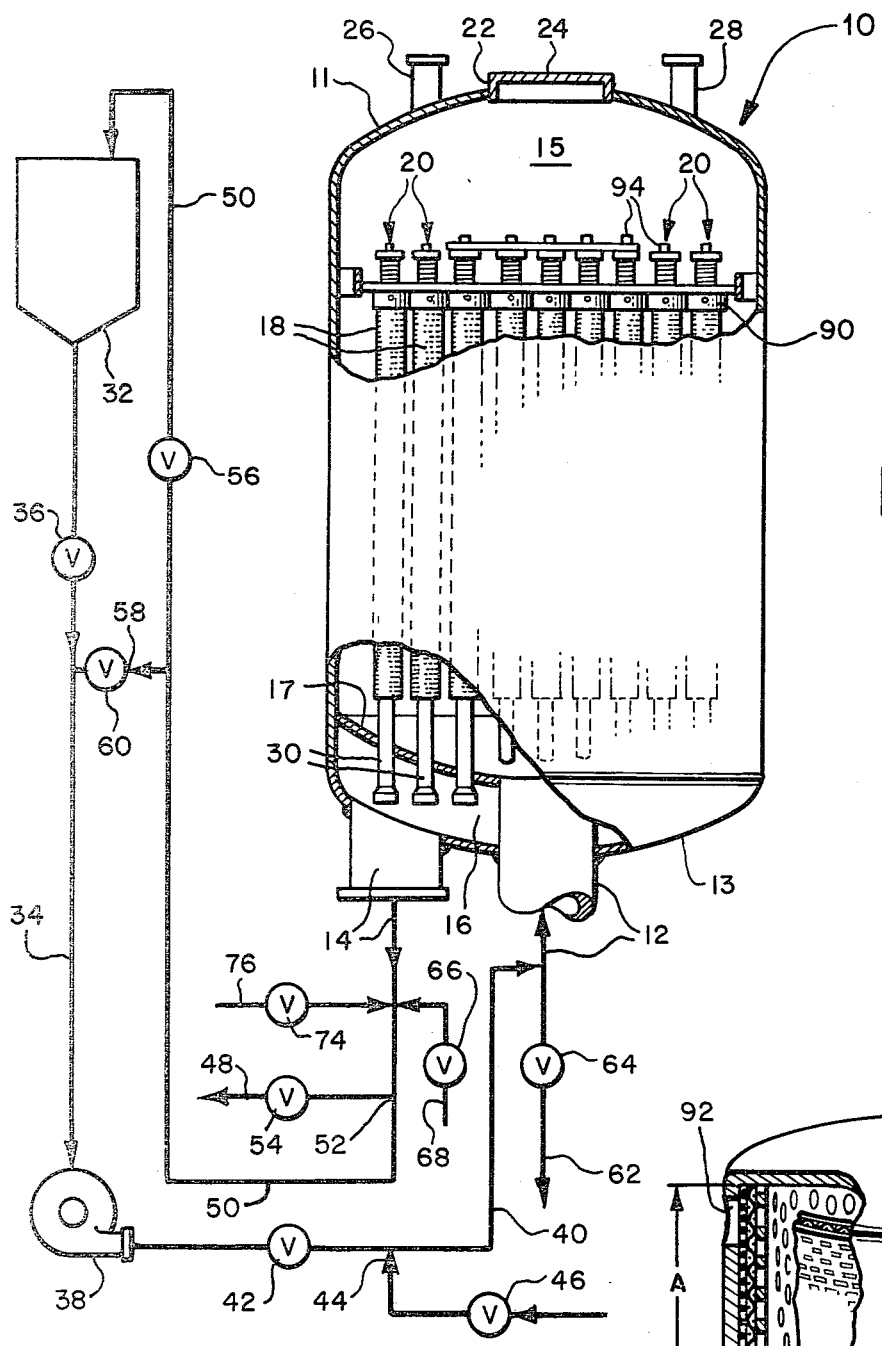
FIG. 1 is a partial cross-sectional view of a typical filter tank having replaceable, cylindrical filter elements which embody the present invention.
FIG. 2 is a perspective view of a filter element according to the present invention, parially cut away to show a central support core, a layer of coarse screen, a discontinuously slotted sheet providing a support for the filter medium, and a vent sleeve.

Referring now to the drawings, and more particularly to FIG. 1, a filtering device utilizing the apparatus of the present invention is generally indicated by reference numeral 10. This device is of the type which is shown and described in U.S. Pat. No. 3,279,608, and is assigned to the assignee of this invention. The filter device 10 is adapted to receive an influent stream, filter the influent stream, and discharge the filtrate of effluent stream.

The filter tank 10 is a generally cylindrical vessel made of steel or the like having an outwardly convex top 11 and an outwardly convex bottom 13. The tank 10 is divided into an influent zone 15 and a filtrate zone 16 by a downwardly curved tube sheet plate 17 suitably secured to the interior of the tank 10 by welding or the like. The influent line 12 extends through the bottom 13 of the tank and communicates with the influent zone 15 so that all the influent water is passed directly to the influent zone 15. The influent pipe 12 is attached to the tube sheet plate 17 by welding or the like. In this manner, direct communication between the influent zone 15 and the filtrate zone 16 is precluded.

Figure 3:
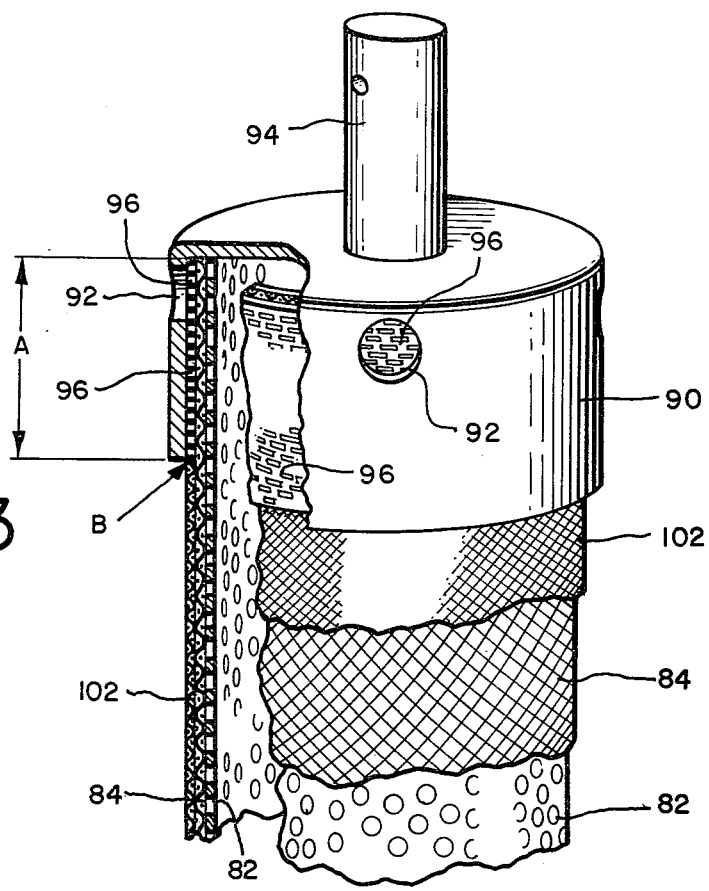
FIG. 3 is a perspective view of an additional preferred embodiment according to the present invention, partially cut away to show the relationship of the slotted sheet means to other layers of the element and a vent sleeve.
Figure 4:
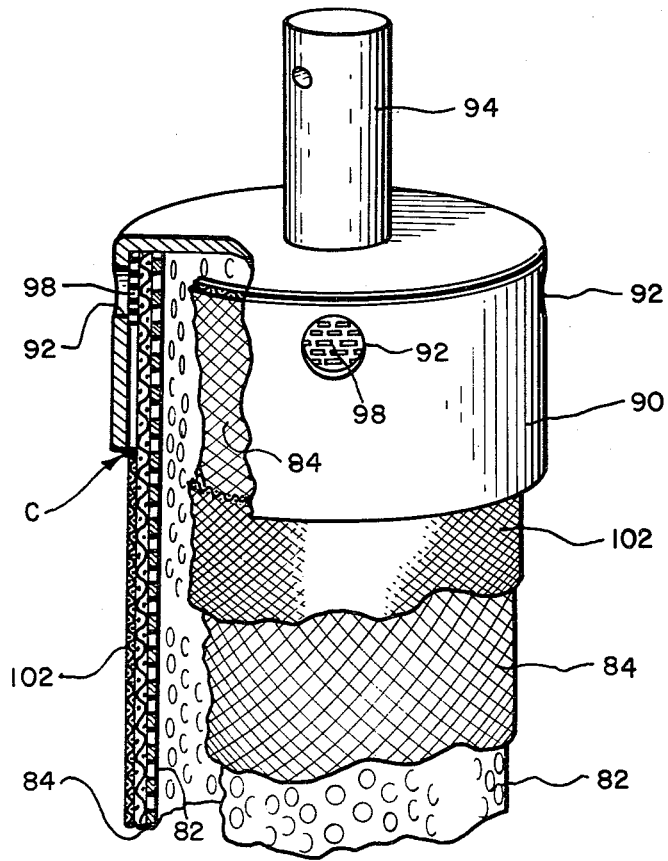
FIG. 4 is a perspective view of another preferred embodiment according to the present invention, partially cut away to show the relationship of the slotted sheet means to other layers of the element and an aperture in a vent sleeve.

Mounted within the influent zone 15 are a plurality of filter elements 18 through which the influent stream must pass before entering the filtrate zone 16 and being discharged from the filter tank 10 through the outlet line 14. The filter elements 18 have a reduced bubble point pressure in accordance with some preferred embodiments of the present invention, provided by a discontinuously slotted sheet 86 as shown in FIG. 2. Alternatively the filter elements 18 may embody the present invention as illustrated in FIGS. 3 and 4. Each filter element 18 is held in place in the influent zone 15 of the filter tank 10 by a holding assembly indicated generally by reference numeral 20. This holding assembly 20 includes a centering pin 94 on a cover member 90 as shown in FIGS. 2-4, and is adapted to releasably hold the filter element 18 in place upon a filter seat means 30 which is attached to the tube sheet plate 17. The filter elements 18 are placed into and removed from the filter tank 10 through a small manhole opening 22 in the filter tank 10. The manhole opening 22 has a cover means 24 which may be removed or opened, as desired, to provide access to the interior of the filter tank 10.

The filter tank 10 is also provided with a vent 26 and a spare nozzle 28, which in this instance is capped. The vent 26 may be of any suitable construction, the selection of appropriate vent means being dependent generally upon the use of the filter tank 10 and being within the ordinary skill of one in the art.

The filter seal means 30 comprises a small pipe made of steel or the like which extends through a hole in the tube sheet plate 17 and is attached to the tube sheet plate 17 by welding or other suitable means. The filter seat means 30 is substantially parallel to the longitudinal axis of the filter tank 10 and provides communication between the influent zone 15 and the filtrate zone 16. The filter seat means 30 provides a base for the filter element 18, which is held in position on the seat means 30 by the holding assembly 20.

A filter element 18 according to a preferred embodiment of the present invention is illustrated in more detail in FIG. 2. This element 18 includes a tubular support core 82, a layer of coarse screen 84 concentrically disposed about the support core 82, and an outermost layer of discontinuously slotted sheet metal 86 concentrically disposed about and bonded to the coarse screen 84 for supporting the filter medium of finely divided resin particles, typically in the size range of 60 to 400 mesh or smaller. The tubular support core 82 is porous, and may be a perforated core 82 as shown in FIG. 2, a core of wound fibrous or packed granular material (not shown), or any suitable core member permeable to liquid. The tubular support core 82 is preferably constructed of stainless steel, and provided with a plurality of symmetrically spaced apertures to produce approximately twenty percent open area on the outer surface of the support core 82. The preferred range of percent open area or perforation of the support core 82 is from five percent to sixty-five percent, and the inside diameter of the support core 82 preferably is between ¾ inch and 2½ inch.

The layer of coarse drain mesh or screen 84 is used to support the outer slotted sheet layer 86 and to distribute the flow of liquid between the slotted sheet 86 and the support 82. The screen 84 is sized so as not to have any measurable impact upon the bubble point pressure of the filter element in general. In the preferred embodiment the coarse screen 84 is about 100 mesh in size. The limiting member in setting the bubble point pressure for the filter element 18 is the outer slotted sheet layer 86. This sheet is formed of a suitable metal, preferably 0.002 inch thick nickel, which can accept rectangular slots 88 having a width of about 30 microns and a length of about 430 microns. The slotted sheet 86 is arranged for dimensional stability so that the length of each slot 88 extends along the circumference of the filter element 18, as shown in FIGS. 2, 3, and 4.

Although the slots 88 are shown as rectangular in shape, they may be oval or any elongated shape, having a width suitable to uniformly define an absolute particle retention ability for the slotted sheet 86. The length of a slot 88 is at least about one and one-half times the smaller dimension, thereby producing a large slot cross-sectional area and promoting a low bubble pressure, while the desired low micron rating for the absolute particle retention ability of the sheet is achieved. It can be shown that in a case where the slot length is much greater than the slot width, the bubble point pressure of such a slot 88 approaches one-half the bubble point pressure of a circular pore, the diameter of which is equal to the width of the sot 88. For a slot with a width of 30 microns, the length of the slot is preferably at least 45 microns.

However, the length of each slot cannot be so great than the width dimension loses its required tolerance, as may occur when each slot is effectively a continuous opening around the circumference of an element 18. Since the degree of gas entrapment in a cylindrical element 18 increases as the bubble point pressure of the filtration layer 86 increases, the degree of gas entrapment associated with some preferred embodiments of the element 18 covered with the slotted sheet 86 is less than that associated with a similar element covered by a filtration layer containing circular pores or capillaries of the same absolute particle retention ability.

As shown in FIG. 2, the filter element 18 also includes a dome-shaped cover member or vent sleeve 090 which closes off the upper portion of the element 18. At least one vent hole 92, and preferably three or four, passes through the upper portion of the vent sleeve 90 so as to permit fluid communication between the inside of the filter element 18 and the area outside the filter element 18. Although the holes 92 are shown in FIGS. 2, 3, and 4 as being on a cylindrical side wall of the vent sleeve 90, one or more apertures may also be placed on the uppermost surface of the vent sleeve 90 and accomplish the desired results, if a slotted sheet 86, 96 or 98 is used according to the present invention. In the preferred embodiment of FIG. 2, the support core 82, coarse screen 84, and slotted sheet 86 all extend upward behind the vent holes 92. The purpose of the vent sleeve 90 is to prevent entrapped gas from contacting the precoatable surface of the element 18, as defined by the slotted sheet 86 in the preferred embodiment of FIG. 2, and a fine mesh screen 102 in FIGS. 3 and 4.

When the vent sleeve 90 is properly sized, a gas-liquid interface occurs at the bottom of the vent sleeve 90 after the tank 10 is filled with liquid, and the presence of this interface underneath the vent sleeve 90 prevents gas from contacting the precoatable surface of the elements 18. As the pressure of the filter tank is increased, which typically occurs during precoating of filter elements 18, entrapped gas is compressed, moving the gas-liquid interface upward and further insuring that gas is prevented from contacting the surface of the filter element 18 on which the precoat layer is to be placed.

The critical length A needed for sizing the vent sleeve 90 is equal to the height of the volume of entrapped gas which would be present after a water fill step if no vent sleeve 90 is used. The critical length A is measured as the vertical distance from the gas-liquid interface to the highest exposed slots at the top of the element, and the distance is proportional to the bubble point pressure of the slotted sheet 86. The gas-liquid interface occurs within the tubular support core for elements which are mounted in a filter tank 10 having a bottom tube sheet 17 as shown in FIG. 1, and the interface occurs on the vessel side of the filter element when a top tube sheet design (not shown) is utilized, as is known in the art.

The bubble point pressure referred to in this application is defined by the bubble point test method used in Aerospace Recommended Practice (ARP) 901, issued Mar. 1, 1968, by the Society of Automotive Engineers, Incorporated. In short, to obtain a bubble point pressure for a particular filter, the filter is immersed in the test liquid to wet and saturate the pore structure of the filter. Gas pressure is applied to the inside of the filter element so that the liquid that has wetted the filter element is displaced by the gas. The gas pressure is slowly increased until the first steady stream of gas bubbles is observed as emitting from a point on the filter element. The bubble point pressure is defined as the measured gas pressure required to form the first bubble released from the filter element and is essentially equal to the pressure force which is in equilibrium with the surface tension force at the largest opening in the outer filter element layer.

According to the preferred embodiment of the present invention as shown in FIG. 3, the filter element includes a discontinuously slotted sheet band 96 positioned under the vent sleeve 90. The slotted sheet band 96 has the same preferred slot dimensions, material construction, and other limitations as the slotted sheet 86. However, the filter precoat is supported along the exposed length of the filter element 18 by a fine mesh screen 102, positioned around the coarse screen 84 and the support core 82. As illustrated in FIG. 3, the fine mesh screen 102 terminates a distance from the end of the tubular core 82 so that an element section is defined having the bubble point pressure determined by the coarse screen 84, and therefore relatively low by comparison with the fine mesh screen 102. The slotted sheet band 96, having a lower bubble point pressure than the fine mesh screen 102 but greater than the coarse screen 84, is positioned over the relatively low bubble pressure element section and sealed to the fine mesh screen 102 at point B by welding or other suitable methods, to prevent passage of liquid through the filter element 18 without purification. The vent sleeve 90 is positioned over the slotted sheet band 96, and is attached to the band 96 by any suitable means also to prevent passage of liquid through the filter element without purification. As illustrated in FIG. 3, vent holes 92 of the vent sleeve 90 are covered by a portion of the slotted sheet band 96, and entrapped gas is released from the filter element 18 through the relatively low bubble pressure slotted sheet band 96 and the vent holes 92. The dimensions of the slots in the band 96 are chosen to have an absolute particle retention ability equal to that of the fine mesh screen 102, in order that impurities which reach the slotted sheet band 96 will not pass through.

With the preferred embodiment of the apparatus of the present invention shown in FIGS. 2 and 3, it may be found, depending on the parameters of the filter element 18 and filter unit 10, that no air is entrapped in the filter element 18, as discussed in Example II below. In such circumstances, the critical length A for sizing the vent sleeve 90 may be substantially diminished and the structure of the vent sleeve 90 is changed to operate as a cover member, as is known in the art, with release of gas accomplished through the slotted sheet 86 or the slotted sheet band 96.

According to an additional preferred embodiment of the present invention, illustrated in FIG. 4, the fine mesh screen 102, coarse screen 84, and support tube 82 are arranged as in the embodiment of FIG. 3. However, a discontinuously slotted sheet disc 98 is secured to the vent sleeve 90 immediately below the aperture 92 by tack welding, diffusion bonding, or any suitable means, thereby providing a relatively low bubble pressure member for release of entrapped gas while also permitting impurities which inadvertently reach the vent sleeve aperture 92 to be trapped by the slotted sheet disc 98. Therefore, the slot dimensions of the disc 98 are chosen so that the disc 98 has an absolute particle retention ability equal to that of the fine mesh screen 102. Also, the vent sleeve 90 is attached to the fine mesh screen 102 by welding or other suitable means at point C. The slots of the disc 98 are dimensioned as discussed with reference to the slotted sheet 86, and the preferred material construction and other limitations of the slotted sheet 86 are applicable to the disc 98.

Particularly with respect to the preferred embodiments of FIGS. 2 and 3, it is preferred that the slotted sheet 86 and the slotted sheet band 96 be secured to the coarse wire screen 84 by a process of diffusion bonding to numerous points on the sheet 86 and band 96. However, because the band 96 is positioned beneath the vent sleeve 90, other suitable bonding and sealing processes may also be used for that embodiment. For use with a slotted sheet 86 or band 96 of nickel and a coarse screen 84 of stainless steel, the preferred diffusion bonding method, sometimes referred to as sintering, includes pressing the sheet 86 or band 96 against the coarse screen 84 in a hydrogen atmosphere or a vacuum, and bringing the temperature of the material to about 2000° F. for a period of time, thereby causing a diffusion or particles between the sheet 86 or band 96 and the coarse screen 84 effecting bonding.

In the operation of the apparatus shown in FIG. 1, a liquid slurry of the precoat medium, in this instance finely divided ion exchange resin particles in the size range of about 60 to 400 mesh or smaller, is stored in a precoat tank 32. A slurry line 34, controlled by a slurry valve 36, connects the precoat tank with a slurry pump 38. A transfer line 40 connects the pump 38 with the inlet line 12 of the filter tank 10. A transfer valve 42 adjacent the pump 38 and in the transfer line 40 controls the passage of slurry from the pump 38.

The liquid to be treated enters the filter system through a feed line 44 having an intake control valve 46. The feed line 44 is connected to the transfer line 40 between the control transfer valve 42 and the inlet line 12.

The outlet line 14 from the filter tank 10 is connected to a service line 48 and a precoat return line 50 at a T-juncture indicated by reference numeral 52. The service line 48 is connected to service units not shown, such as a steam generator and the like, and has a service valve 54. The precoat return line 50 is connected to the precoat tank 32 and has a return valve 56 to control the flow of slurry back to the precoat tank 32.

A bridge line 58 with a bridge valve 60 interconnects the precoat return line 50 and the slurry line 34. A drain line 62 with a valve 64 communicates with the inlet line 12.

During the precoating step a precoat layer of finely divided ion exchange resin particles is deposited upon the upstream sides of the filter elements 18, i.e., the sides where the liquid is introduced into the filter element 18. Similarly, during the filtering step a filter cake builds up within and on the upstream side of the precoat layer.

In preparing the filter system for operation the initial step is to precoat the filter elements 18. To these ends, the filter tank 10 is filled with low impurity water, such as demineralized water. A slurry of precoat medium and demineralized water is prepared in the precoat tank 32, the precoat medium being finely divided ion exchange resin particles.

During the precoating step all the valves are closed, except the slurry valve 36, the transfer valve 42, the return valve 56, and the bridge valve 60. The pre-coating step is initiated by starting the pump 38, thereby drawing the resin precoat slurry from the precoat tank 32 and through the slurry line 34 to the pump 38. The slurry is forced by the pump 38 through the transfer line 40 and the inlet line 12 into the filter tank 10. The pressure of the incoming slurry forces the demineralized water in the filter tank 10 via the filtrate zone 16 and the outlet line 14. A portion of demineralized water enters the precoat tank 32 through the return line 50, and a second portion is delivered to the slurry line 54 through the bridge line 58.

As cycling continues the precoat slurry is brought into contact with the upstream surfaces of the filter elements 18. The finely divided resin particles of the precoat medium are separated from the slurry and deposited as the precoat layer upon the upstream surfaces of the filter elements 18. The slurry is circulated through the filter system in this manner until a sufficient depth of the resin precoat layer is deposited upon the upstream surface of the filter elements 18. The precoating step is terminated by closing the slurry valve 36 and the return valve 56. Then the filter system is ready to be used to treat the feed water or liquid. The thickness of the precoat layer on the slotted sheet 86 is not critical, but it is preferred that the layer have a thickness in the range of about 1/16 to 2 inches, more preferably about $\frac{1}{8}$ to 1 inch, and most preferably $\frac{1}{8}$ to $\frac{5}{8}$ inch.

The service run is begun by opening the service valve 54 and the intake valve 46. In this manner, untreated liquid enters the filter system through the feed line 44 and passes through the transfer line 40 and the inlet line 12 into the filter tank 10. The pressure of the incoming untreated liquid forces it through the resin precoat layer, the filters 18 and the filtrate zone 16 into the outlet line 14. Following the establishment of the service flow, the transfer valve 42 and bridge valve 60 are closed and the pump 38 is stopped.

As the untreated liquid passes through the precoat layer, an ion exchange reaction takes place to remove dissolved impurities from the liquid. In addition, undissolved impurities are removed from the untreated liquid by virtue of the liquid passing through the precoated filter elements 18. Filter cake, consisting of the undissolved impurities, builds up within and on the precoat layer as the process continues. The purified liquid is directed to a supply tank or suitable equipment by the service line 48.

Eventually the resins will become exhausted and must be regenerated or discarded. At this time the filtering or service cycle is stopped by closing the intake valve 46 and the service valve 54. The filter tank 10 is then cleaned. To these ends, the vent 26 and the drain valve 64 are opened, and water plus a cleaning gas, usually air, are passed into the interior of the filter element 18 at its lower end to clean the filter element 18 progressively from top to bottom. The air is introduced into the interior of the filter element 18 by opening a valve 66 in the air line 68 communicating with the outlet line 14. At the same time, water is introduced into the filter element 18 by opening a valve 74 in the backwash line 76. Air under pressure and backwash water thereby enter the filtrate zone 16 and pass upwardly into the interior of the filter element 18. Preferably, the flow rate of the air is in the range of about 1 to 2 standard cubic feet per minute per square foot of filter surface area, while the water flow range is about 0.5 gallons per minute per square foot of filter. The drain valve 62 is controlled so that the water level falls slowly, preferably at a rate of about 10–15 inches per minute. The air and water entering the filter tank 10 therefore tend to pass first through the upper portion of the filter element 18 and remove the precoat layer therefrom.

After the filter tank 10 has been drained, the drain valve 64 is closed, and the tank begins to refill with liquid, which passes in reverse flow through the filter element 18. After the tank 10 fills to a level about six inches above the tops of the filter element 18, the valves 66, 74 in the air line 68 and backwash line 76 are closed, and the backwash water is removed from the tank 10 by opening the valve 64.

The drain valve 64 is closed, and the filter elements 18 are again backwashed by opening the valves 66, 74 on the air line 68 and backwash line 76, respectively. A somewhat higher liquid flow rate, e.g., 1–2 gallons per minute per square foot of filter, is employed during this step. Air is also delivered at about 1.5 standard cubic feet per minute per square foot. After the tank 10 has filled to a level above the tops of the filter elements 18, the drain valve 64 is again opened to permit the liquid level to fall at a rate of about ten to fifteen inches per minute, while the flow of air and backwash liquid is continued. The backwash valve 74 is closed, and draining with the introduction of air only is continued for a short time to assure complete draining. After the tank 10 empties, the drain valve 64 and the air valve 66 are closed. The backwash valve 74 is opened, and the tank 10 is permitted to fill for a third time. After the tank 10 has filled, vent 26 and valve 74 on the backwash line are closed. The tank 10 is filled with water, and the filter elements 18 are now ready for the application of a new precoat, as previously described.

Though air has been discussed as the cleaning gas, other gases may be used as the cleaning gas, such as nitrogen, oxygen and the like. Air, however, is generally speaking, the most economical and it is readily available in most plants. Similarly, liquids other than water may be used during the backwashing cycle. Exemplary of such liquids are alcohols, cabron tetrachloride and detergent and soap solutions. It is preferred that the liquids have a temperature in the range of about 100° to 200° F.

Typical solid cation exchange resin particles which may be employed in the specific filtering method discussed herein are the divinylbenzene-styrene copolymer type, the acrylic type, the sulfonated coal type and the phelonic type. These may be used in sodium, hydrogen, or ammonium form, for example. Typical solid anion exchange resin particles that may be employed are the phenolformaldehyde type, the divinylbenzene-styrene copolymer type, the acrylic type and the epoxy type. The anion resin particles may be used in the hydroxide or chloride form, for example. Suitable resins are sold commercially in the large bead form under the trade names Amberlite IR-120 and Amberlite IRA-400, sold by Rohm & Haas Company; and Dowex HCR-S and Dowex SBR-P, sold by Dow Chemical Company. The finely divided resins are prepared by reducing the particle size range. These resin particles are regenerated and washed prior to use.

The examples below are intended to set forth applications of the apparatus of the present invention, and not to limit the scope of the present invention.

EXAMPLE I

Bubble point pressure measurements were made on filter elements having an outer layer comprising 165×800 stainless steel wire mesh cloth and on a filter element having a slotted sheet material according to the present invention as an outer layer. The slotted sheet material had a slot dimension of 30×430 microns. When used as filtration layers, both the 165×800 steel wire mesh cloth and 30×430 microns slotted sheet material have an absolute particle retention ability of about 30 microns.

The bubble point tests were run according to the procedure recommended in the Aerospace Recommended Practice document (ARP) 901 published by the Society of Automotive Engineers, Inc., issued Mar. 1, 1968. Raw data were corrected, also according to ARP-901, to obtain the standard bubble point pressure for each element based in isopropanol at 77° F. The results were that the standard bubble point pressure in isopropanol at 77° F. for 165×800 wire mesh cloth is 6.9 inches of water, and the standard bubble point pressure for the slotted sheet filter element of the precoat invention with 30 ×430 microns slots is 4.2 inches of water.

Therefore, the filter element having an outer slotted sheet layer according to the present invention had a lower bubble point pressure than a prior art element having the same absolute particle retention ability. This reduction in bubble point pressure allows more air to escape through the filter element of the present invention during pre-coating and filtering steps than through prior art elements.

EXAMPLE II

A filter element constructed with 165×800 wire mesh cloth was tested in a pilot laboratory for use as a precoat support filter. After fill and precoat steps on the filter system about 9 inches of the top of the filter element were left unprecoated because of gas entrapment. In light of the bubble point pressure data which were accumulated in Example I, the degree of gas entrapment expected with an element employing a 30×430 micron slotted sheet as an outer layer would be less than that for the wire mesh cloth element, however it would be expected that some gas would still be entrapped, and a portion of the element would be unprecoated, calculated by the ratio of bubble point pressures of the slotted sheet and wire mesh elements, as about 5.5 inches.

However, when an element covered with the 30×430 micron slotted sheet layer of the present invention was built and tested, it was found that the element could be precoated over its entire length, indicating that no gas was entrapped. Thus, gas is eliminated by the present invention without using a vent sleeve or other cover member.

Though the filtering apparatus described above has been discussed in relation to a precoat layer of finely divided ion exchange precoat particles, the apparatus is likewise applicable where the precoat layer is diatomaceous earth, cellulose fibers, polyacrylonitrile fibers, or any other precoat material, as will be understood by one with ordinary skill in the art. Moreover, though the embodiments and refinements which do not depart from the true spirit and scope of the present invention may be conceived by those skilled in the art. It is intended that all such modifications be covered by the following claims.

I claim:

1. A filter element, adapted to be precoated with a filter medium, comprising:
   a porous tubular core;
   means supporting the filter medium precoat, said means including a discontinuously slotted sheet arranged concentrically about said tubular core, each of said slots having an absolute particle retention ability less than about 50 microns, and an elongated configuration whereby gas entrapment in the filter element during precoating and filtration is reduced.

2. The filter element of claim 1 wherein the width of each slot is up to about 30 microns and the length of each slot is between about 45 and 430 microns.

3. The filter element of claim 1 wherein the length of each of said slots is at least about one and one-half times the width of each of said slots.

4. The filter element of claim 1 wherein said filter element has an absolute particle retention ability of less than about 30 microns and a bubble point pressure of less than about 6.9 inches of water.

5. In a liquid filtering apparatus including a filter tank, a plate separating said tank into an influent compartment and a filtrate compartment, at least one filter element comprising:
   a vertically extending porous tubular core element; and
   a discontinuously slotted sheet means positioned about said tubular core for supporting a filter medium, wherein the slots are elongated, having a width of about 50 microns or less.

6. A filter element adapted to be precoated with a filter medium of finely divided ion exchange resin particles smaller than about 250 microns, comprising:
   a porous tubular core;
   a coarse screen positioned about said tubular core; and
   a slotted sheet positioned about said coarse screen, said sheet having a plurality of discontinuous slots, each slot having a width of up to about 50 microns and a length of at least about one and one-half times the width of the slot.

7. A filter element adapted to be precoated with a filter medium, comprising:
   a porous tubular core;
   means for supporting the filter medium precoat, said precoat support means positioned about said tubular core and terminating a distance from an end of said tubular core so that a relatively low bubble point pressure element section is defined; and
   discontinuously slotted sheet means positioned over the relatively low bubble point pressure element section and sealed to said precoat support means, said discontinuously slotted sheet means having elongated slots, each slot having a width of up to about 50 microns and a length of at least about one and one-half times the width of the slot.

8. The filter element of claim 7 further comprising a vent sleeve positioned over and attached to said slotted sheet means, said vent sleeve having an aperture covered by said slotted sheet means.

9. A filter element adapted to be precoated with a filter medium, comprising:
   a porous tubular core;
   means for supporting the filter medium precoat, said precoat support means positioned about said tubular core and terminating a distance from an end of said tubular core so that a relatively low bubble point pressure element section is defined;
   a vent sleeve attached to said precoat support means, said vent sleeve having an aperture covered by a discontinuously slotted sheet means having elongated slots, each slot having a width of up to about 50 microns and a length of at least about one and one-half times the width of the slot.

10. In a liquid filtering apparatus including a filter tank, a plate separating said tank into an influent compartment and a filtrate compartment, at least one filter element having a porous tubular core, and precoat means for distributing precoat particles on each filter element, the improvement to each filter element comprising:
    a discontinuously slotted sheet means positioned about said tubular core for supporting a filter medium, each of said slots having an elongated configuration wherein the width of each slot is up to about 50 microns and the length of each slot is at least about one and one-half times the width of the slot.

11. In a liquid filtering apparatus including a filter tank, a plate separating said tank into an influent compartment and a filtrate compartment, at least one filter element having a porous tubular core and a coarse screen positioned about said tubular core, and precoat means for distributing a filter medium of finely divided ion exchange resin particles smaller than about 250 microns on each filter element, the improvement to each filter element comprising:
    a slotted sheet positioned about said coarse screen, said sheet having a plurality of discontinuous slots, each slot having a width up to about 50 microns and a length of at least about one and one-half times the width of the slot.

12. In a liquid filtering apparatus including a filter tank, a plate separating said tank into an influent compartment and a filtrate compartment, at least one filter element vertically mounted in said influent compartment and having a porous tubular core, and precoat means for distributing precoat particles on each filter element, the improvement to each filter element comprising:
    means for supporting the filter medium precoat, said precoat support means positioned about said tubular core and terminating a distance from an end of said tubular core so that a relatively low bubble point pressure element section is defined; and
    discontinuously slotted sheet means positioned over the relatively low bubble point pressure element section and sealed to said precoat support means, said discontinuously slotted sheet means having elongated slots, each slot having a width of up to about 50 microns and a length of at least about one and one-half times the width of the slot.

13. The filter element of claims 1, 5, 6, 7, 9, 10, 11, or 12 wherein each slot is about 30 microns wide and about 430 microns long.

14. The filter element of claims 6 or 11 wherein the slotted sheet is bonded to the coarse screen.

15. The filter element of claims 6 or 11 wherein the slotted sheet is diffusion bonded to the coarse screen.

* * * * *

UNITED STATES PATENT AND TRADEMARK OFFICE
CERTIFICATE OF CORRECTION

PATENT NO. : 4,293,414

DATED : October 6, 1981

INVENTOR(S) : Joseph F. Giannelli

It is certified that error appears in the above—identified patent and that said Letters Patent is hereby corrected as shown below:

Title page, the name of the inventor should be --Giannelli--, not "Gianneli";

Column 4, line 19, insert a comma after --embodiments--;

Column 4, line 60, delete "parially" and substitute therefor --partially--;

Column 6, line 26, after "support", insert --core--;

Column 6, line 52, delete "sot" and substitute therefor --slot--;

Column 6, line 68, delete "090" and substitute therefor --90--;

Column 8, line 63, delete "to" and substitute therefor --at--;

Column 9, line 5, delete "or" and substitute therefor --of--;

Column 9, line 50, delete "pre-coat-" and substitute therefor --precoat- --;

Column 10, line 35, delete "cleaning" and substitute therefor --cleansing--;

Column 11, line 16, delete "cleaning" and substitute therefor --cleansing--;

Column 11, line 17, delete "cleaning" and substitute therefor --cleansing--;

UNITED STATES PATENT AND TRADEMARK OFFICE
CERTIFICATE OF CORRECTION

PATENT NO. : 4,293,414

DATED : October 6, 1981

INVENTOR(S) : Joseph F. Giannelli

It is certified that error appears in the above—identified patent and that said Letters Patent is hereby corrected as shown below:

Column 11, line 22, delete "cabron" and substitute therefor --carbon--;

Column 12, line 2, delete "microns" and substitute therefor --micron--;

Column 12, line 9, delete "pre-coating" and substitute therefor --precoating--.

Signed and Sealed this

Eighteenth Day of May 1982

[SEAL]

Attest:

Attesting Officer

GERALD J. MOSSINGHOFF

Commissioner of Patents and Trademarks